United States Patent
Chen

(10) Patent No.: US 7,639,750 B2
(45) Date of Patent: Dec. 29, 2009

(54) PHASE TRACKING METHOD AND DEVICE THEREOF

(75) Inventor: Chin-Hung Chen, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 540 days.

(21) Appl. No.: 11/486,070

(22) Filed: Jul. 14, 2006

(65) Prior Publication Data

US 2007/0253497 A1 Nov. 1, 2007

(30) Foreign Application Priority Data

Apr. 26, 2006 (TW) .............................. 95114873 A

(51) Int. Cl.
*H04K 1/10* (2006.01)
(52) U.S. Cl. ................... 375/260; 375/350; 375/371; 375/327
(58) Field of Classification Search ................. 375/260, 375/350, 371, 374, 326, 327, 333
See application file for complete search history.

(56) References Cited

U.S. PATENT DOCUMENTS

| | | | | |
|---|---|---|---|---|
| 5,754,437 | A * | 5/1998 | Blazo | 702/75 |
| 6,363,102 | B1 * | 3/2002 | Ling et al. | 375/147 |
| 6,985,549 | B1 * | 1/2006 | Biracree et al. | 375/355 |
| 7,372,919 | B1 * | 5/2008 | Lou et al. | 375/329 |
| 2004/0076239 | A1 | 4/2004 | Yu et al. | |
| 2004/0181744 | A1 * | 9/2004 | Sindhushayana | 714/794 |
| 2005/0100106 | A1 | 5/2005 | Chen | |
| 2005/0105589 | A1 * | 5/2005 | Sung et al. | 375/130 |
| 2007/0036555 | A1 * | 2/2007 | Chen et al. | 398/188 |

FOREIGN PATENT DOCUMENTS

| | | |
|---|---|---|
| JP | 2001-053712 A | 2/2001 |
| TW | 567660 B | 12/2003 |
| TW | 583853 B | 4/2004 |
| TW | 222521 B | 10/2004 |
| TW | 241793 B | 10/2005 |

* cited by examiner

*Primary Examiner*—David C Payne
*Assistant Examiner*—Rahel Guarino
(74) *Attorney, Agent, or Firm*—Birch, Stewart, Kolasch & Birch, LLP

(57) ABSTRACT

A phase tracking device. A sampler samples the received signal according to a sampling frequency correction signal to generate a first signal. A phase de-rotator adjusts the phase of the first signal according to a carrier frequency correction signal to generate a second signal. A fast Fourier transformer performs a fast Fourier transformation on the second signal according to a symbol edge to generate a third signal. An equalizer equalizes the third signal according to the estimated channel to generate an output signal. A selector selects the output signal which meets the predetermined condition. A phase error metric processor generates the correction signals for both sampling clock frequency offset and carrier frequency offset according to the selected sub-carrier indexes and their corresponding phase error metrics and channel estimates.

28 Claims, 5 Drawing Sheets

PHASE TRACKING METHOD AND DEVICE THEREOF

BACKGROUND OF THE INVENTION

1. Field of the Invention

The invention relates to a phase tracking device, and more particularly to a method for synchronizing the carrier frequency and sampling clock frequency in an orthogonal frequency division multiplexing system.

2. Description of the Related Art

OFDM (Orthogonal Frequency Division Multiplexing) is a widely used data transmission technique, which divides a wideband channel into multiple narrowband sub-channels to carry out simultaneous transmission of the sub-carriers. Although the sub-carriers are overlapped in the frequency spectrum, they do not interfere with each other due to their orthogonality.

OFDM is sensitive to synchronization errors due to the narrow sub-carrier spacing. Synchronization errors comprise CFO (carrier frequency offset) and SFO (sampling frequency offset). CFO is caused by the mismatch of the oscillation frequency between the transmitter and receiver, Doppler effect, and phase noise, while SFO is caused by the mismatch of the sampling clock cycle between the transmitter and receiver.

The algorithm for tracking CFO and SFO must evaluate the drift phase of each pilot for each OFDM symbol. However, in the time dispersive channel, the pilot may locate in the decline of the channel and thus suffers from low signal to noise ratio (SNR).

In "Joint Weighted Least-Square Estimation of Carrier-Frequency Offset and Timing Offset for OFDM Systems Over Multi-path Fading Channels" issued by Pei-Yun Tasi discloses the weighted least square (WLS) algorithm for overcoming the described problem.

FIG. 1 illustrates a conventional phase compensating circuit comprising sampler 102, phase compensator 104, FFT (Fast Fourier Transform) circuit 106, coarse synchronization circuit 108, and phase tracking circuit 110.

First, in the training stage of a packet, a CFO estimate and an estimated symbol boundary index are generated by coarse synchronization circuit 108 according to the preamble portion of the received signal. The phase of the subsequent received signal is then adjusted by phase compensator 104 according to the estimated symbol boundary and the initial CFO estimate. An estimated channel $\hat{H}_{l,k}$ is generated through exploiting the initially adjusted received signal by a channel estimator.

The receiver then enters a phase tracking stage. FFT circuit 106 transforms the initially adjusted received signal into frequency domain according to the estimated symbol boundary. A phase error $\angle X_{l,m}$ of two time adjacent pilots in the same sub-carrier is generated by phase tracking circuit 110 with CORDIC (Coordinate Rotation Digital Computer) circuit, and a sampling frequency adjusting signal $\hat{\delta}_l$ and a carrier frequency adjusting signal $\hat{\epsilon}_l$ are produced according to the WLS algorithm. The equation of the WLS algorithm is as follow:

$$\hat{\epsilon}_l = \frac{\sum_{m \in M}(|H_{l,m}|^2 \cdot m^2) \cdot \sum_{m \in M}(|H_{l,m}|^2 \cdot \angle X_{l,m}) - \sum_{m \in M}(|H_{l,m}|^2 \cdot m) \cdot \sum_{m \in M}(|H_{l,m}|^2 \cdot \angle X_{l,m})}{\left(2\pi \frac{N_s}{N}\right)\left[\sum_{m \in M}|H_{l,m}|^2 \cdot \sum_{m \in M}(|H_{l,m}|^2 \cdot m^2) - \left(\sum_{m \in M}(|H_{l,m}|^2 \cdot m)\right)^2\right]}$$

$$\hat{\delta}_l = \frac{\sum_{m \in M}(|H_{l,m}|^2) \cdot \sum_{m \in M}(|H_{l,m}|^2 \cdot \angle X_{l,m} \cdot m) - \sum_{m \in M}(|H_{l,m}|^2 \cdot m) \cdot \sum_{m \in M}(|H_{l,m}|^2 \cdot \angle X_{l,m})}{\left(2\pi \frac{N_s}{N}\right)\left[\sum_{m \in M}|H_{l,m}|^2 \cdot \sum_{m \in M}(|H_{l,m}|^2 \cdot m^2) - \left(\sum_{m \in M}(|H_{l,m}|^2 \cdot m)\right)^2\right]}$$

wherein $\hat{H}_{l,k}$ is the estimated channel, $\angle X_{l,m}$ is the phase error, l is the index of the OFDM symbol, m is the index of the sub-carrier, M is a set of all pilot indexes, N stands for N-point FFT, and Ns is the OFDM symbol length. Then, sampler 102 outputs newly sampled signal according to the sampling frequency adjusting signal $\hat{\delta}_l$, while phase compensator 104 adjusts the newly sampled signal according to the carrier frequency adjusting signal $\hat{\epsilon}_l$.

The WLS algorithm described above may cause excessive delay and power consumption due to the high complexity in the channel weighting and phase error calculation process.

BRIEF SUMMARY OF INVENTION

A detailed description is given in the following embodiments with reference to the accompanying drawings.

A phase tracking device for an OFDM system, wherein the pilot sub-carriers and the data sub-carriers are bi-phase shift keying or quadrature phase shift keying, comprising: a sampler generating a first signal through sampling the received signal according to a sampling frequency adjusting signal; a phase de-rotator generating a second signal through adjusting the phase of the first signal according to a carrier frequency adjusting signal; a fast Fourier transform circuit generating a third signal through performing the fast Fourier transform on the second signal according to a symbol boundary index; an equalizer outputting an output signal through equalizing the third signal according to a estimated channel; a selector selecting the sub-carrier index of which is within a predetermined set or whose corresponding channel power is greater than a predetermined value out of the output signal; and a phase error metric processor generating a phase error metric according to the real and imaginary part of the selected output signal and the corresponding constellation type, and further generating the sampling frequency adjusting signal and carrier frequency adjusting signal according to the estimated channel and the phase error metric, wherein the phase error metric approximates the phase difference between the selected output signal and the ideal signal multiplied by the corresponding channel power.

A phase tracking method for adaptively using the data sub-carriers to improve the performance of the residual phase tracking circuit, comprising: obtaining a carrier frequency offset estimate and a symbol boundary index according to the training portion of the received signal; sampling the received signal according to a sampling signal to generate a first signal; adjusting the phase of the first signal according to the carrier frequency offset estimate and a carrier frequency adjusting signal to generate a second signal; performing the fast Fourier transform on the second signal according to the symbol boundary to generate a third signal; equalizing the third signal according to the estimated channel to generate an output signal; selecting the output signal when the output signal meets a predetermined requirement; obtaining a phase error metric for the selected output signal, the real and imaginary part of the selected output signal, and the corresponding constellation type; and obtaining the sampling frequency adjusting signal and the carrier frequency adjusting signal according to those selected sub-carrier indexes and their corresponding phase error metrics and channel estimates.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
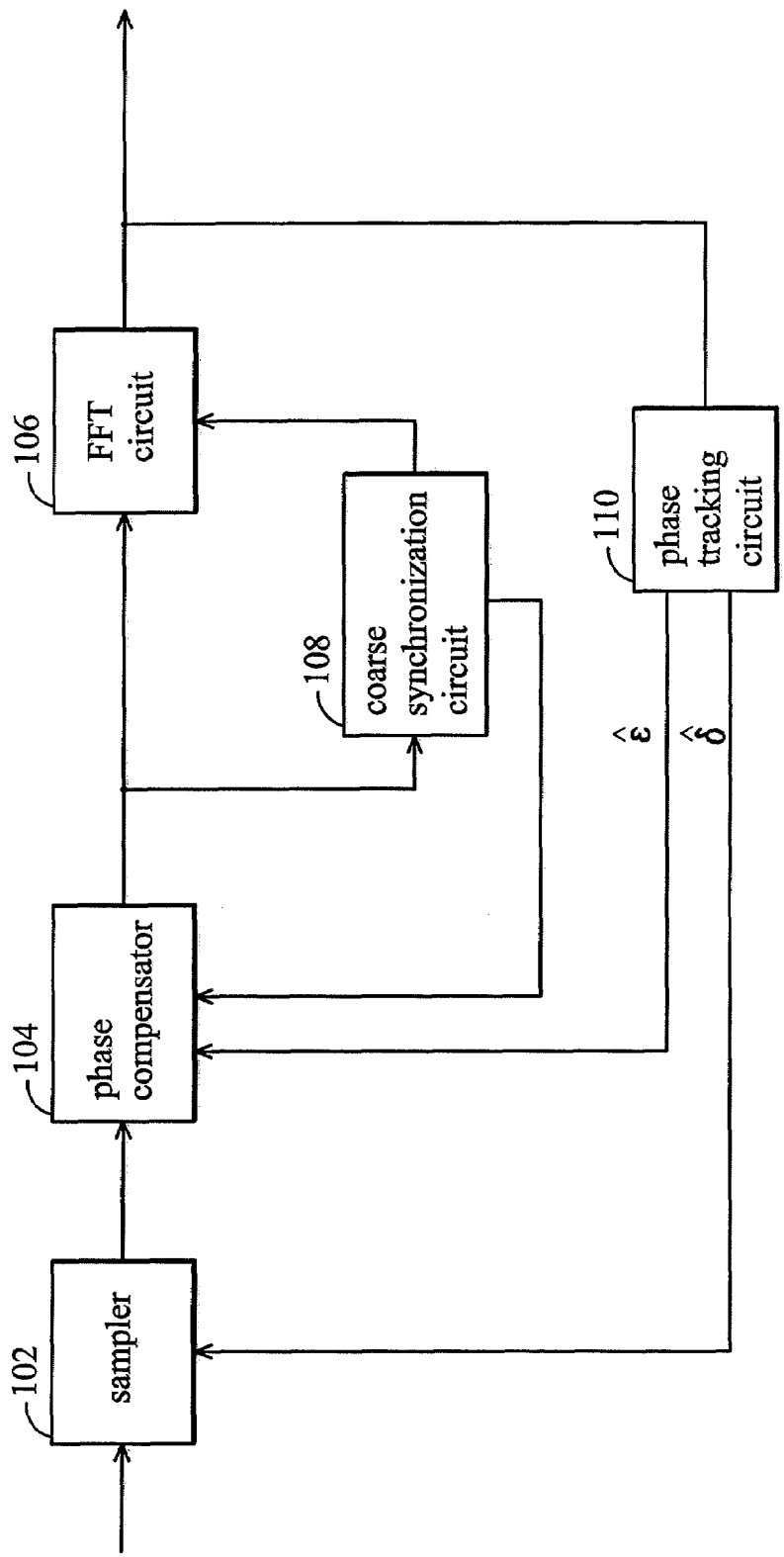
FIG. 1 is a schematic view showing a conventional phase tracking circuit.
Figure 2:
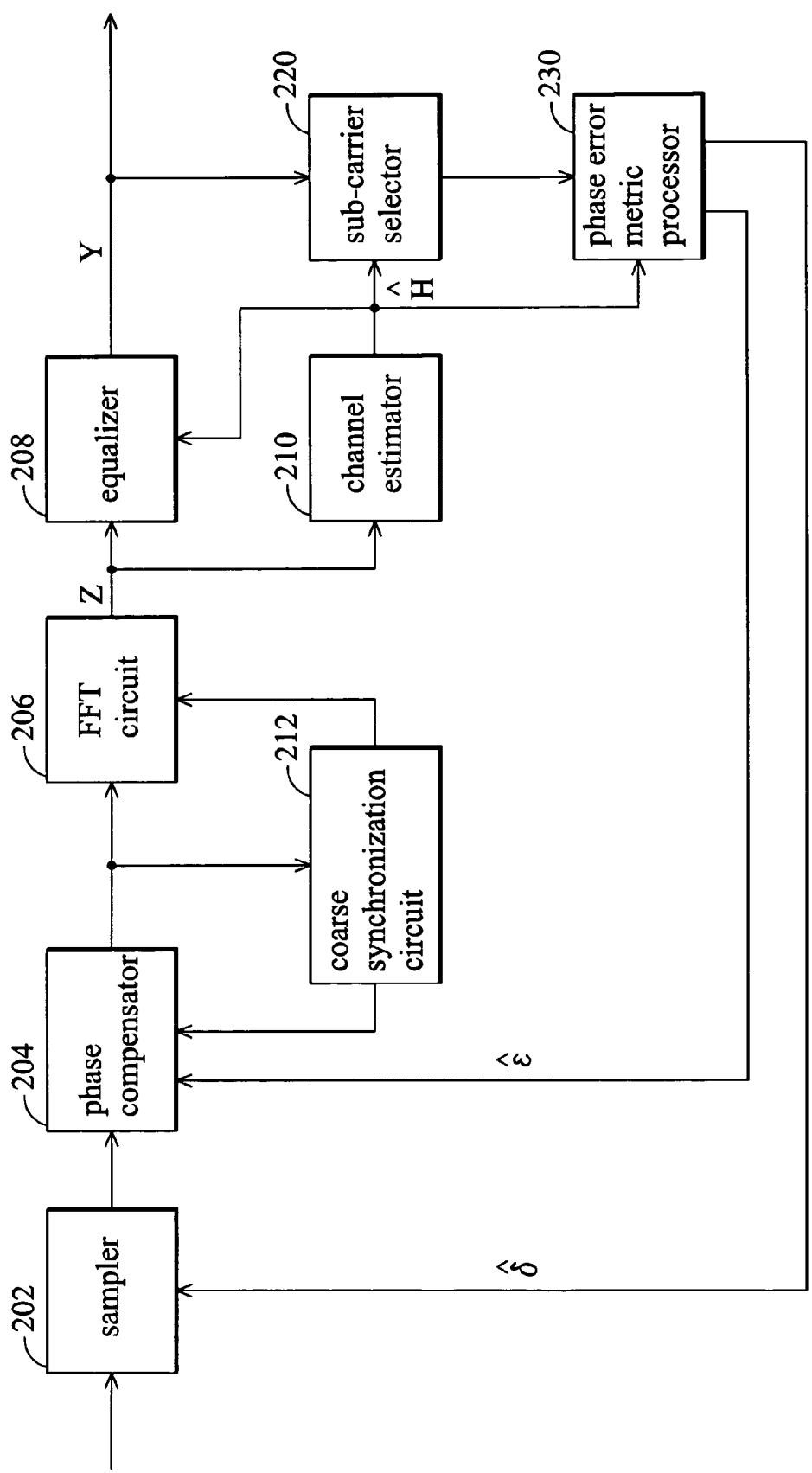
FIG. 2 illustrates the residual phase tracking circuit of the invention suitable for OFDM.

FIG. 2 illustrates the residual phase tracking circuit of the invention suitable for OFDM. The residual phase tracking circuit comprises sampler 202, phase compensator 204, FFT circuit 206, equalizer 208, channel estimator 210, coarse synchronization circuit 212, sub-carrier selector 220 and phase error metric processor 230.

Figure 3:
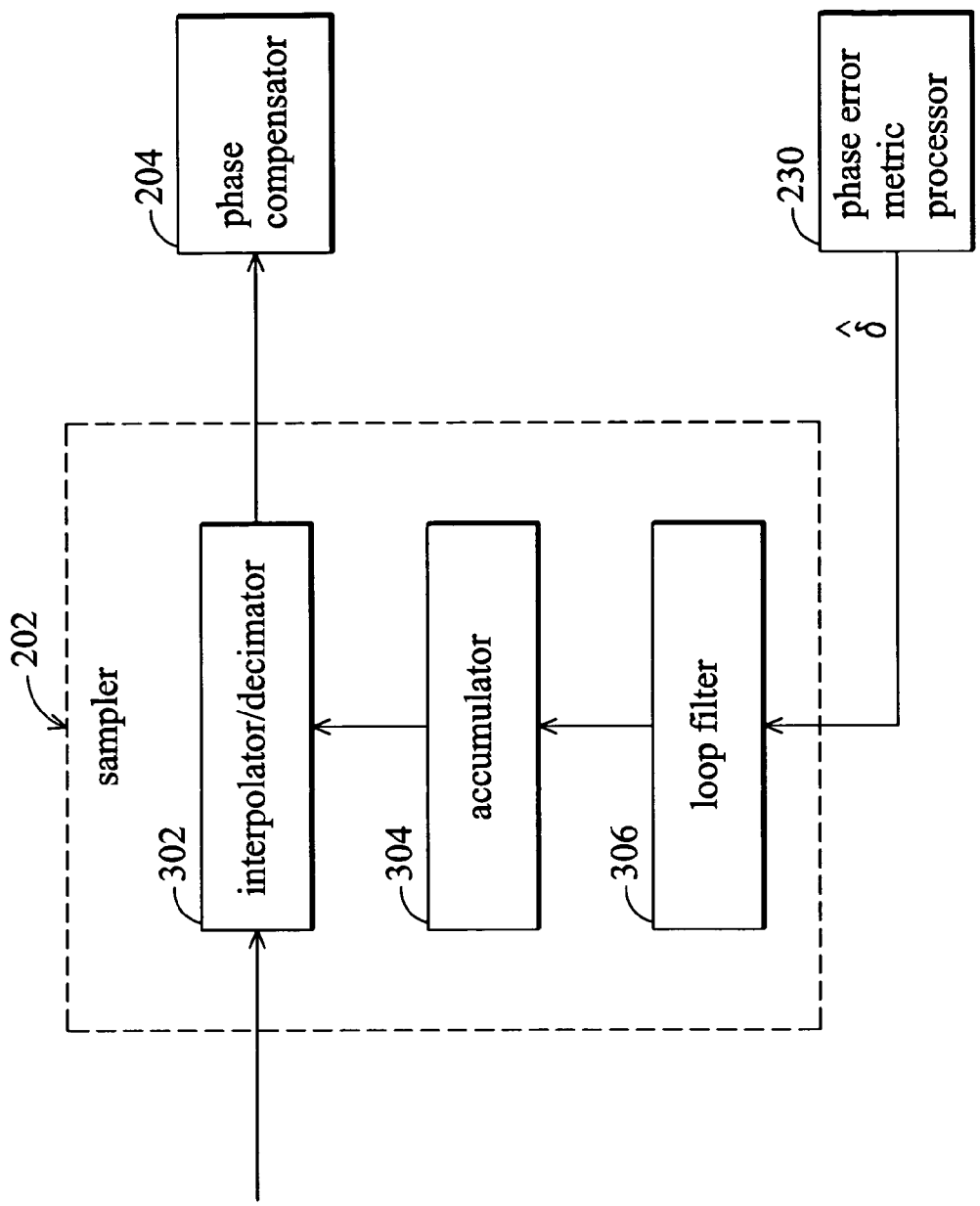
FIG. 3 is a schematic view showing the sampler according to the invention.

FIG. 3 is a schematic view showing the sampler 202 according to the invention comprises loop filter 306, accumulator 304 and interpolator/decimator 302.

Figure 4:
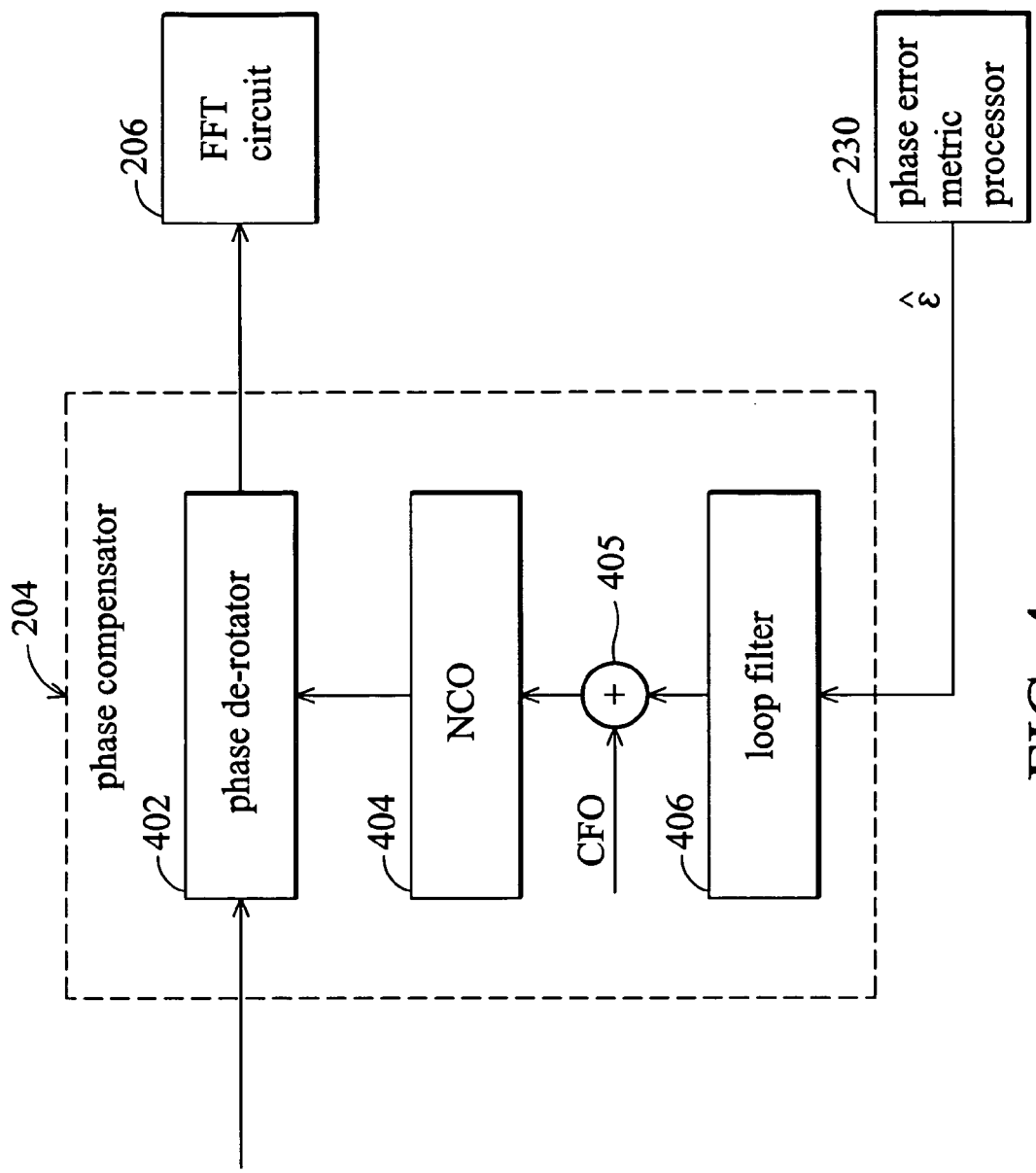
FIG. 4 is a schematic view showing the phase compensator according to the invention.

FIG. 4 is a schematic view showing the phase compensator 204 according to the invention comprises loop filter 406, adder 405, NCO (Number Controlled Oscillator) 404 and phase de-rotator 402.

First, in the training stage of a packet, a CFO estimate and an estimated symbol boundary index are generated by coarse synchronization circuit 212 according to the preamble portion of the received signal. The phase of the subsequent received signal is then adjusted by phase compensator 204 according to the initial CFO estimate. An estimated channel $\hat{H}_{l,k}$ is generated through exploiting the initially adjusted received signal by a channel estimator 210.

Figure 5:
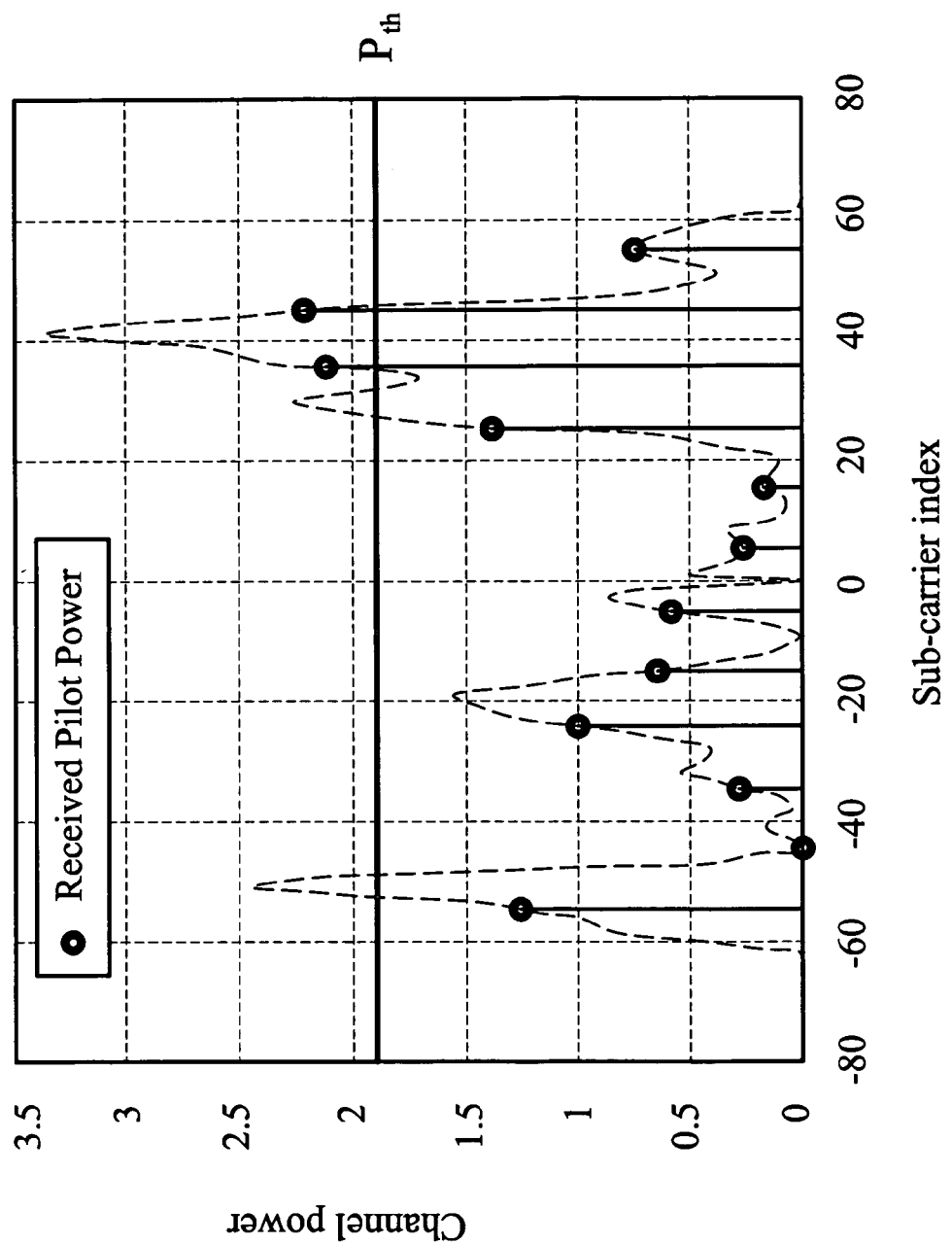
FIG. 5 is a schematic view showing the sub-carriers with respect to channel power.

A receiver then enters the phase tracking stage. The signal $Z_{l,m}$ is generated through performing FFT on the initial compensated received signal by FFT circuit 206 according to the estimated symbol boundary. The signal $Y_{l,m}$ is generated by equalizing the signal $Z_{l,m}$ via equalizer 208 according to the estimated channel $\hat{H}_{l,m}$, $Y_{l,m}=Z_{l,m}\cdot\hat{H}_{l,m}^*$, wherein l is the symbol index and m is the sub-carrier index. Sub-carrier selector 220 determines whether to input the signal $Y_{l,m}$ to phase error metric processor 230 or not according to the predetermined conditions. The predetermined conditions may be: (1) select the signal $Y_{l,k\in M}$ that sub-carrier index m is within a predetermined index set M, (2) select the signal $Y_{l,m}$ whose corresponding channel power is greater than a threshold power $P_{th}$ (as can be seen in FIG. 5). M is the set of all pilot sub-carriers when the transmitted data sub-carriers are not BPSK (bi-phase shift keying) or QPSK (quadrature phase shift keying). Note that the predetermined conditions in sub-carrier selector 220 can be defined by those skilled in the art according to different requirements. Then, $\theta_{l,m}$ is generated by a phase evaluating circuit of phase error metric processor 230 according to the real and imaginary part of the selected signal $Y_{l,m}$. $\theta_{l,m}$ approximates the phase difference between the selected signal $Y_{l,m}$ and the ideal signal weighted by the corresponding channel power $|H_{l,m}|^2$. Note that the phase evaluating circuit is the application of a COSTAS circuit. The sampling frequency adjusting signal $\hat{\delta}_l$ and carrier frequency adjusting signal $\hat{\epsilon}_l$ are generated by the simplified WLS algorithm according to $\theta_{l,m}$, selected sub-carrier index m, and the corresponding estimated channel power $|H_{l,m}|^2$.

The phase error metric $\theta_{l,m}$ is generated by $$\frac{Q \times \text{Sign}(I) - I \times \text{Sign}(Q)}{\sqrt{2}}$$

when the constellation of the sub-carrier selected by the sub-carrier selector is QPSK:

$$\left[\left(\frac{1}{\sqrt{2}}, \frac{1}{\sqrt{2}}\right), \left(\frac{1}{\sqrt{2}}, -\frac{1}{\sqrt{2}}\right), \left(-\frac{1}{\sqrt{2}}, -\frac{1}{\sqrt{2}}\right), \left(-\frac{1}{\sqrt{2}}, \frac{1}{\sqrt{2}}\right)\right]$$

or BPSK:

$$\left[\left(\frac{1}{\sqrt{2}}, \frac{1}{\sqrt{2}}\right), \left(-\frac{1}{\sqrt{2}}, -\frac{1}{\sqrt{2}}\right)\right], \left[\left(\frac{1}{\sqrt{2}}, -\frac{1}{\sqrt{2}}\right), \left(-\frac{1}{\sqrt{2}}, \frac{1}{\sqrt{2}}\right)\right],$$

wherein I is the real part of the selected signal $Y_{l,m}$, Q is the imaginary part of the selected signal $Y_{l,m}$, and Sign(x) is the function to determine the polarity of x.

The phase error metric $\theta_{l,m}$ is generated by Q×Sign(I)−I×Sign(Q) when the constellation of the sub-carrier selected by the sub-carrier selector is QPSK: [(1,0), (0,1), (−1,0), (0,−1)], wherein I is the real part of the product of the selected signal $Y_{l,m}$ and $$\frac{\pm(1 \pm j)}{2},$$

Q is the imaginary part of the product of the selected signal $Y_{l,m}$ and $$\frac{\pm(1 \pm j)}{2},$$

and Sign(x) is the function to determine the polarity of x.

The phase error metric $\theta_{l,m}$ is generated by Q×Sign(I) when the constellation of the sub-carrier selected by the sub-carrier selector is BPSK: [(1,0), (−1,0)], wherein I is the real part of the selected signal $Y_{l,m}$, Q is the imaginary part of the selected signal $Y_{l,m}$, and Sign(x) is the function to determine the polarity of x.

The phase error metric $\theta_{l,m}$ is generated by −I×Sign(Q) when the constellation of the sub-carrier selected by the sub-carrier selector is BPSK: [(0,1), (0,−1)], wherein I is the real part of the selected signal $Y_{l,m}$, Q is the imaginary part of the selected signal $Y_{l,m}$ and Sign(x) is the function to determine the polarity of x.

The function of the simplified WLS algorithm is as follows:

$$\begin{bmatrix}\hat{\delta}_l\\\hat{\epsilon}_l\end{bmatrix}=\frac{\overbrace{\begin{bmatrix}\sum_{m\in M}|H_{l,m}|^2 & -\sum_{m\in M}(|H_{l,m}|^2\cdot m)\\-\sum_{m\in M}(|H_{l,m}|^2\cdot m) & \sum_{m\in M}(|H_{l,m}|^2\cdot m^2)\end{bmatrix}}^{A}\cdot\overbrace{\begin{bmatrix}\sum_{m\in M}(\theta_{l,m}\cdot m)-\sum_{m\in M}(\theta_{l-1,m}\cdot m)\\\sum_{m\in M}(\theta_{l,m})-\sum_{m\in M}(\theta_{l-1,m})\end{bmatrix}}^{B}}{\underbrace{\left(2\pi\frac{N_S}{N}\right)\left[\sum_{m\in M}|H_{l,m}|^2\cdot\sum_{m\in M}(|H_{l,m}|^2\cdot m^2)-\left(\sum_{m\in M}(|H_{l,m}|^2\cdot m)\right)^2\right]}_{C}}$$

wherein $\hat{H}_{l,k}$ is the estimated channel, $\theta_{l,m}$ is the phase error weighted by the channel gain, m is the sub-carrier index of the signal $Y_{l,m}$, M is the set of sub-carrier indexes selected by sub-carrier selector 220, N stands for N-point FFT, and Ns is the OFDM symbol length.

Part A and part C of the function of the simplified WLS algorithm can be calculated immediately after the estimated channel $\hat{H}_{l,k}$ is obtained. In general, part A and part C will not change during receiving the whole packet in the indoor wireless environment. Note that part B of the function may be updated when receiving an OFDM symbol.

Then, loop filter 306 filters the high frequency part of the sampling frequency adjusting signal $\hat{\delta}_l$. Accumulator 304 is used to accumulate the filtered sampling frequency adjusting signal $\hat{\delta}_l$. Interpolator/decimator 302 samples the received signal according to the output of accumulator 304 to output a newly sampled signal. Loop filter 406 filters the high frequency part of the carrier frequency adjusting signal $\hat{\epsilon}_l$. Adder 405 is used to add the filtered carrier frequency adjusting signal $\hat{\epsilon}_l$ and the initial CFO estimate. NCO 404 lookups the lookup table according to the output of adder 405 to output a oscillation frequency. Phase de-rotator 402 adjusts the phase of the output of sampler 202 according to the oscillation frequency.

The residual phase tracking circuit of the invention performs the residual phase tracking according to the algorithm with channel power weighting, and the data sub-carriers can function as virtual pilot sub-carriers in the invention. Thus, the accuracy for estimating the CFO and the SFO can be enhanced. In addition, in the invention, the phase error of the QPSK and the BPSK signal is approximated by the error signal as that produced in the COSTAS circuit. The channel weighting process required in the simplified WLS algorithm is inherent in the phase error metric $\theta_{l,m}$, since the phase error evaluated by the COSTAS circuit is proportional to the amplitude of $\sqrt{I^2+Q^2}$. The conventional method for performing channel weighting and calculating the phase error by the CORDIC circuit can be replaced by the method described, such that the hardware complexity may be effectively reduced.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A phase tracking device for an OFDM system, wherein the pilot sub-carriers and the data sub-carriers are bi-phase shift keying or quadrature phase shift keying, comprising:
    a sampler generating a first signal through sampling a received signal according to a sampling frequency adjusting signal;
    a phase compensator generating a second signal through adjusting a phase of the first signal according to a carrier frequency adjusting signal;
    a fast Fourier transform circuit generating a third signal through performing a fast Fourier transform on the second signal according to a symbol boundary index;
    an equalizer outputting an output signal through equalizing the third signal according to an estimated channel;
    a selector selecting the sub-carrier index of which is within a predetermined set or whose corresponding channel power is greater than a predetermined value out of the output signal; and
    a phase error metric processor generating a phase error metric according to a real part and an imaginary part of the selected output signal and a corresponding constellation type, and further generating the sampling frequency adjusting signal and the carrier frequency adjusting signal according to the estimated channel, selected sub-carrier index, and the-phase error metric, wherein the phase error metric approximates the phase difference between the selected output signal and an ideal signal multiplied by the corresponding channel power.

2. The phase tracking device as claimed in claim 1, wherein the phase de-rotator further generates the second signal through adjusting the phase of the first signal according to a initial carrier frequency offset estimate and the carrier frequency adjusting signal.

3. The phase tracking device as claimed in claim 2, wherein the carrier frequency offset estimate, the symbol boundary index, and the estimated channel are generated according to a training sequence portion of the received signal.

4. The phase tracking device as claimed in claim 2, further comprising a coarse synchronization circuit generating the initial carrier frequency offset estimate and the symbol boundary index.

5. The phase tracking device as claimed in claim 1, wherein the phase error metric is generated by $$\frac{Q\times\mathrm{Sign}(I)-I\times\mathrm{Sign}(Q)}{\sqrt{2}}$$

when the constellation of the sub-carrier selected by the selector is quadrature phase shift keying:

$$\left[\left(\frac{1}{\sqrt{2}}, \frac{1}{\sqrt{2}}\right), \left(\frac{1}{\sqrt{2}}, -\frac{1}{\sqrt{2}}\right), \left(-\frac{1}{\sqrt{2}}, -\frac{1}{\sqrt{2}}\right), \left(-\frac{1}{\sqrt{2}}, \frac{1}{\sqrt{2}}\right)\right]$$

or bi-phase shift keying:

$$\left[\left(\frac{1}{\sqrt{2}}, \frac{1}{\sqrt{2}}\right), \left(-\frac{1}{\sqrt{2}}, -\frac{1}{\sqrt{2}}\right)\right]; \left[\left(\frac{1}{\sqrt{2}}, -\frac{1}{\sqrt{2}}\right), \left(-\frac{1}{\sqrt{2}}, \frac{1}{\sqrt{2}}\right)\right],$$

wherein I is the real part of the selected output signal, Q is the imaginary part of the selected output signal, and Sign(x) is the function to determine the polarity of x.

6. The phase tracking device as claimed in claim 1, wherein the phase error metric is generated by Q×Sign(I)−I×Sign(Q) when the constellation of the sub-carrier selected by the selector is quadrature phase shift keying: [(1,0),(0,1),(−1,0),(0,−1)], wherein I is the real part of a product of the selected output signal and $$\frac{\pm(1 \pm j)}{2},$$

Q is the imaginary part of a product of the selected output signal and $$\frac{\pm(1 \pm j)}{2},$$

and Sign(x) is the function to determine the polarity of x.

7. The phase tracking device as claimed in claim 1, wherein the phase error metric is generated by Q×Sign(I) when the constellation of the sub-carrier selected by the selector is bi-phase shift keying: [(1,0),(−1,0)], wherein I is the real part of the selected output signal, Q is the imaginary part of the selected output signal, and Sign(x) is the function to determine the polarity of x.

8. The phase tracking device as claimed in claim 1, wherein the phase error metric is generated by −I×Sign(Q) when the constellation of the sub-carrier selected by the selector is bi-phase shift keying: [(0,1),(0,−1)], wherein I is the real part of the selected output signal, Q is the imaginary part of the selected output signal, and Sign(x) is the function to determine the polarity of x.

9. The phase tracking device as claimed in claim 1, wherein the sampling frequency adjusting signal and the carrier frequency adjusting signal are generated according to the following function:

$$\begin{bmatrix}\hat{\delta}_l \\ \hat{\epsilon}_l\end{bmatrix} = \frac{\begin{bmatrix}\sum_{m \in M}|H_{l,m}|^2 & -\sum_{m \in M}(|H_{l,m}|^2 \cdot m) \\ -\sum_{m \in M}(|H_{l,m}|^2 \cdot m) & \sum_{m \in M}(|H_{l,m}|^2 \cdot m^2)\end{bmatrix} \begin{bmatrix}\sum_{m \in M}(\theta_{l,m} \cdot m) - \sum_{m \in M}(\theta_{l-1,m} \cdot m) \\ \sum_{m \in M}(\theta_{l,m}) - \sum_{m \in M}(\theta_{l-1,m})\end{bmatrix}}{\left(2\pi \frac{N_S}{N}\right)\left[\sum_{m \in M}|H_{l,m}|^2 \cdot \sum_{m \in M}(|H_{l,m}|^2 \cdot m^2) - \left(\sum_{m \in M}(|H_{l,m}|^2 \cdot m)\right)^2\right]}$$

wherein $\hat{\delta}_l$ is the sampling frequency adjusting signal, $\hat{\epsilon}_l$ is the carrier frequency adjusting signal, $H_{l,k}$ is the estimated channel, $\theta_{l,m}$ is the phase angle, m is the index of the selected output signal, M is the set of all selected sub-carrier indexes, N stands for N-point FFT and $N_s$ is the symbol length.

10. The phase tracking device as claimed in claim 1, wherein the sampler comprising:
a first loop filter filtering a high frequency part of the sampling frequency adjusting signal;
an accumulator accumulating the filtered sampling frequency adjusting signal; and
an interpolator/decimator sampling the received signal according to the output signal of the accumulator.

11. The phase tracking device as claimed in claim 1, wherein the phase de-rotator comprising:
a second loop filter filtering a high frequency part of the carrier frequency adjusting signal;
an adder adding the initial carrier frequency offset estimate and the filtered carrier frequency adjusting signal;
an oscillator outputting an oscillation frequency through looking up a lookup table according to the output of the adder;
a phase de-rotation unit adjusting the phase of the received signal according to the oscillation frequency.

12. A phase tracking method for adaptively using data sub-carriers to improve the performance of a residual phase tracking circuit, comprising:
obtaining a carrier frequency offset estimate and a symbol boundary index according to the training sequence portion of a received signal;
obtaining an estimated channel according to the obtained carrier frequency offset estimate and symbol boundary index during the channel estimation portion of the training sequence;
sampling the received signal according to a sampling adjusting signal to generate a first signal;
adjusting the phase of the first signal according to the initial carrier frequency offset estimate and a carrier frequency adjusting signal to generate a second signal;
performing a fast Fourier transform on the second signal according to the symbol boundary to generate a third signal;
equalizing the third signal according to the estimated channel to generate an output signal;
selecting the output signal when the output signal meets a predetermined requirement;
obtaining a phase error metric according to the sub-carrier index of the selected output signal, a real part and an imaginary part of the selected output signal, and a constellation type of the selected output signal; and
obtaining the sampling frequency adjusting signal and carrier frequency adjusting signal according to the phase error metric and the estimated channel.

13. The phase tracking method as claimed in claim 12, wherein the carrier frequency offset estimate and the symbol boundary index are generated by a coarse synchronization circuit.

14. The phase tracking method as claimed in claim 12, wherein the first signal is generated by a sampler.

15. The phase tracking method as claimed in claim 12, wherein the second signal is generated by a phase de-rotator.

16. The phase tracking method as claimed in claim 12, wherein the third signal is generated by a fast Fourier transform circuit.

17. The phase tracking method as claimed in claim 12, wherein the output signal is generated by an equalizer.

18. The phase tracking method as claimed in claim 12, wherein the output signal is passed through a selector to select those sub-carriers meeting the predetermined requirements.

19. The phase tracking method as claimed in claim 12, wherein the sampling frequency adjusting signal and carrier frequency adjusting signal are generated by a phase error metric processor.

20. The phase tracking method as claimed in claim 18, wherein the predetermined requirement is that the corresponding estimated channel power is greater than a first predetermined value or the power of the selected output signal is greater than a second predetermined value.

21. The phase tracking method as claimed in claim 18, wherein the predetermined requirement is that the sub-carrier index is within a predetermined set.

22. The phase tracking method as claimed in claim 12, the phase error metric is generated by $$\frac{Q \times \text{Sign}(I) - I \times \text{Sign}(Q)}{\sqrt{2}}$$

when the constellation of the sub-carrier selected by the selector is quadrature phase shift keying:

$$\left[\left(\frac{1}{\sqrt{2}}, \frac{1}{\sqrt{2}}\right), \left(\frac{1}{\sqrt{2}}, -\frac{1}{\sqrt{2}}\right), \left(-\frac{1}{\sqrt{2}}, -\frac{1}{\sqrt{2}}\right), \left(-\frac{1}{\sqrt{2}}, \frac{1}{\sqrt{2}}\right)\right]$$

or a bi-phase shift keying:

$$\left[\left(\frac{1}{\sqrt{2}}, \frac{1}{\sqrt{2}}\right), \left(-\frac{1}{\sqrt{2}}, -\frac{1}{\sqrt{2}}\right)\right] \text{ or } \left[\left(\frac{1}{\sqrt{2}}, -\frac{1}{\sqrt{2}}\right), \left(-\frac{1}{\sqrt{2}}, \frac{1}{\sqrt{2}}\right)\right];$$

wherein I is the real part of the selected output signal, Q is the imaginary part of the selected output signal, and Sign(x) is the function to determine the polarity of x.

23. The phase tracking method as claimed in claim 12, the phase error metric is generated by Q×Sign(I)−I×Sign(Q) when the constellation of the sub-carrier selected by the selector is quadrature phase shift keying: [(1,0),(0,1),(−1,0),(0,−1)], wherein I is the real part of the product of the selected output signal and $$\frac{\pm(1 \pm j)}{2},$$

Q is the imaginary part of the product of the selected output signal and $$\frac{\pm(1 \pm j)}{2},$$

and Sign(x) is the function to determine the polarity of x.

24. The phase tracking method as claimed in claim 12, the phase error metric is generated by Q×Sign(I) when the constellation of the sub-carrier selected by the selector is bi-phase shift keying: [(1,0),(−1,0)], wherein I is the real part of the selected output signal, Q is the imaginary part of the selected output signal, and Sign(x) is the function to determine the polarity of x.

25. The phase tracking method as claimed in claim 12, the phase error metric is generated by −I×Sign(Q) when the constellation of the sub-carrier selected by the selector is bi-phase shift keying: [(0,1),(0,−1)], wherein I is the real part of the selected output signal, Q is the imaginary part of the selected output signal, and Sign(x) is the function to determine the polarity of x.

26. The phase tracking method as claimed in claim 12, wherein the sampling frequency adjusting signal and the carrier frequency adjusting signal are generated by the following function:

$$\begin{bmatrix} \hat{\delta}_l \\ \hat{\epsilon}_l \end{bmatrix} = \frac{\begin{bmatrix} \sum_{m \in M} |H_{l,m}|^2 & -\sum_{m \in M} (|H_{l,m}|^2 \cdot m) \\ -\sum_{m \in M} (|H_{l,m}|^2 \cdot m) & \sum_{m \in M} (|H_{l,m}|^2 \cdot m^2) \end{bmatrix} \cdot \begin{bmatrix} \sum_{m \in M} (\theta_{l,m} \cdot m) - \sum_{m \in M} (\theta_{l-1,m} \cdot m) \\ \sum_{m \in M} (\theta_{l,m}) - \sum_{m \in M} (\theta_{l-1,m}) \end{bmatrix}}{\left(2\pi \frac{N_s}{N}\right)\left[\sum_{m \in M} |H_{l,m}|^2 \cdot \sum_{m \in M} (|H_{l,m}|^2 \cdot m^2) - \left(\sum_{m \in M} (|H_{l,m}|^2 \cdot m)\right)^2\right]}$$

wherein $\hat{\delta}_l$ is the sampling frequency adjusting signal, $\hat{\epsilon}_l$ is the carrier frequency adjusting signal, $H_{l,k}$ is the estimated channel, $\theta_{l,m}$ is the phase error metric, m is the sub-carrier index of the selected output signal, M is the set of all selected sub-carrier indexes, N stands for N-point FFT and $N_s$ is the symbol length.

27. The phase tracking method as claimed in claim 14, wherein the sampler comprising:
a first loop filter filtering a high frequency part of the sampling frequency adjusting signal;
an accumulator accumulating the filtered sampling frequency adjusting signal; and
an interpolator/decimator sampling the received signal according to the output signal of the accumulator.

28. The phase tracking method as claimed in claim 15, wherein the phase de-rotator comprising:
a second loop filter filtering a high frequency part of the carrier frequency adjusting signal;
an adder adding the initial carrier frequency offset estimate and the filtered carrier frequency adjusting signal;
an oscillator outputting an oscillation frequency through looking up a lookup table according to the output of the adder;
a phase de-rotation unit adjusting the phase of the received signal according to the oscillation frequency.

* * * * *